United States Patent
Glienicke et al.

(10) Patent No.: US 7,022,961 B2
(45) Date of Patent: Apr. 4, 2006

(54) OPTICAL INDICATOR ELEMENT

(75) Inventors: Haiko Glienicke, Bad Neustadt (DE);
Michael Haub, Bad Kissingen (DE)

(73) Assignee: Preh-Werke GmbH & Co. KG, Saale (DE)

(*) Notice: Subject to any disclaimer, the term of this patent is extended or adjusted under 35 U.S.C. 154(b) by 238 days.

(21) Appl. No.: 10/378,837

(22) Filed: Mar. 5, 2003

(65) Prior Publication Data

US 2003/0173496 A1    Sep. 18, 2003

(30) Foreign Application Priority Data

Mar. 5, 2002    (DE) ................. 102 09 622

(51) Int. Cl.
*G01J 1/32*    (2006.01)
(52) U.S. Cl. .............. 250/205; 250/214 AL
(58) Field of Classification Search ........... 250/205, 250/214 AL, 214 B, 463.1, 465.1, 466.1
See application file for complete search history.

(56) References Cited

U.S. PATENT DOCUMENTS

| | | | |
|---|---|---|---|
| 4,368,406 A | * | 1/1983 | Kruzich et al. ......... 315/158 |
| 5,736,696 A | * | 4/1998 | Del Rosso ................ 200/5 R |
| 5,896,010 A | * | 4/1999 | Mikolajczak et al. ...... 315/77 |

FOREIGN PATENT DOCUMENTS

| | | |
|---|---|---|
| DE | 39 14 232 A1 | 10/1990 |
| DE | 40 10 998 A1 | 10/1991 |
| DE | 196 02 891 A1 | 8/1997 |
| DE | 197 38 666 C1 | 2/1999 |
| DE | 198 40 070 A1 | 3/2000 |
| DE | 198 53 819 A1 | 5/2000 |
| DE | 299 18 847 U1 | 3/2001 |
| DE | 199 43 840 A1 | 4/2001 |

* cited by examiner

*Primary Examiner*—Thanh X. Luu
(74) *Attorney, Agent, or Firm*—Birch, Stewart, Kolasch & Birch, LLP

(57) ABSTRACT

An optical indicator element includes a locator and function symbol that is equipped with a shared optical indicator element, with the intensity of the shared light input being adapted and regulated in brightness to the current ambient brightness. Regulation is accomplished through a PWM (pulse-width modulated) signal from a control device. The indicator element itself comprises a shared and preferably colored plastic that illuminates the locator and function symbol, with the area of the joint symbol being cleared of colored paint on the plastic. The light is preferably guided from at least one light source to the plastic by a light conductor into which the light is coupled, but this can also be accomplished by at least one light source located directly beneath the plastic.

25 Claims, 1 Drawing Sheet

OPTICAL INDICATOR ELEMENT

This nonprovisional application claims priority under 35 U.S.C. § 119(a) on German Patent Application No. 102 09 622.8 filed in Germany on Mar. 5, 2002, which is herein incorporated by reference.

BACKGROUND OF THE INVENTION

1. Field of the Invention

The present invention relates to an optical indicator element, which receives light from at least one light source.

2. Description of the Background Art

Symbols on control or operating elements, for example in a motor vehicle, are illuminated or back-lighted by light sources for better recognizability and differentiation, especially in case of night driving. It is known that one requirement in the illumination of such operating elements is illuminating the symbols uniformly for night-and-day design.

In practice, both the locator and function symbols are illuminated separately from one another for this purpose. Depending on the size of the operating element, it is illuminated directly or through a light conductor system. For illuminating the function symbol, for example, a light conductor is led into the knob area and the light from a light source is coupled into the function symbol. The locator symbol is illuminated by lateral coupling of the light through another light conductor.

DE 198 40 070 A1, DE 197 38 666 C1, and DE 198 53 819 A1 describe such backlighted operating elements. The last-mentioned patent in particular discloses search lighting or function lighting, wherein in one embodiment it is proposed to make a cap for the switch out of transparent material that is painted in a color of the symbol in a first operating step. In a second operating step, the final surface color of the cap is then applied. To expose the color of the symbol, the color of the surface is then removed with a laser so that the symbol is depicted in its precise shape.

A method and a system for adjusting the brightness of a light can be found in DE 196 02 891 A1. After manufacturing an indicator, a correction factor is determined as a function of the brightness of the light, by adjusting a control voltage or control current of the light to achieve uniform illumination or indicator brightness.

SUMMARY OF THE INVENTION

It is therefore an object of the present invention to provide an optical indicator element, especially for a locator and function symbol, with which the brightness and recognizability are considerably increased even in sunlight.

The concept underlying the invention is to provide a locator symbol and an associated function symbol with a shared optical indicator element, with the intensity of the shared light input being adjusted and regulated in brightness to the actual incident sunlight condition. Regulation is performed by a PWM (pulse-width modulated) signal of a control device.

The indicator element itself comprises a common plastic material, preferably colored, that illuminates both the locator symbol and the function symbol, with the common symbol being removed from colored paint on the plastic. The paint is preferably a laser paint, so that light can then pass through this area with a different color and also with a different intensity than through the symbol area. In special cases, the paint area is dark. The light is guided from at least one light source to the plastic, preferably through a light conductor into which the light is coupled, but lighting can also be accomplished by at least one light source directly beneath the plastic.

To optimize light transmission and legibility of the indication (of the symbol) of the indicator or operating element, the paint color, the plastic color, and the thickness of the plastic (of the indicator element) through which light passes are attuned to one another. The wall thickness is minimized for maximum transmission with adequate reflection. The colored areas of paint and laser-treated plastic are optimized for high contrast.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
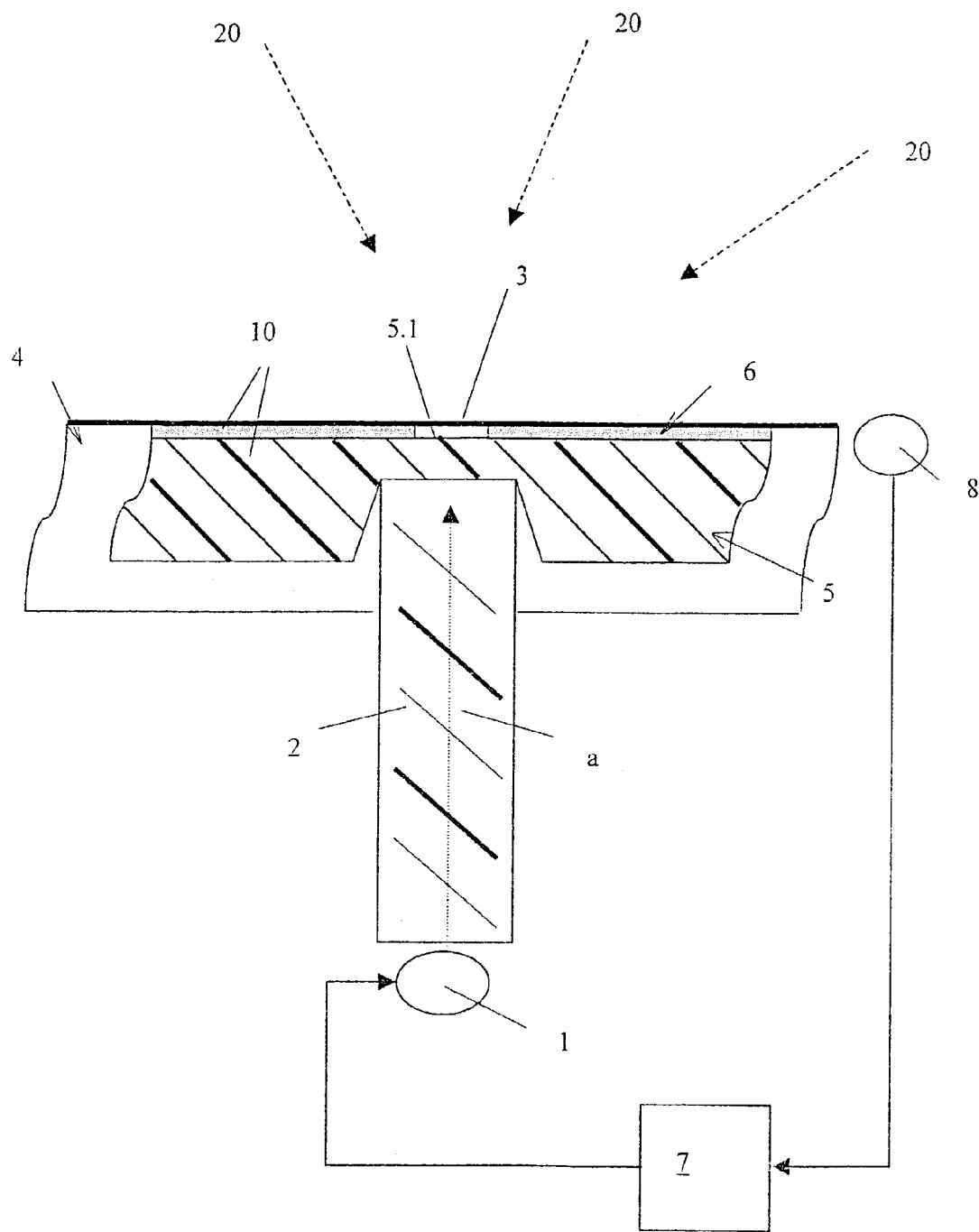
FIG. 1 is a cross-section of the combined locator and function indicator according to a preferred embodiment of the invention.

A light source, for example an LED (Light Emitting Diode), is labeled 1. Light a is fed from the LED into a light conductor 2 and is fed to a locator and function symbol 3 of an operating element 4, only indicated here. The light conductor 2 is preferably physically connected, for example, to a plastic 5 that is colored, for example. This physical connection can be made by injection molding the light conductor 2 to the plastic 5. A paint 6 is applied to the plastic 5, with the paint being removed in the area of the combined locator and function symbol 3, which is made preferably by laser treatment to expose the plastic surface in this area 5.1, or by inlay or extrusion coating techniques. The plastic 5 is translucent.

The plastic 5 with applied paint 6 then constitutes an optical indicator element 10 for the locator and function symbol 3.

The combined locator and function symbol 3 is illuminated through a PWM (Pulse Width Modulated) signal of a control device 7, for example by a microcomputer, in order to be able to regulate the brightness of the LED 1 as a function of the incident solar radiation 20. An opto-electronic sensor 8, for example a phototransistor, measures necessary values relating to the ambient brightness, which is for regulating the brightness of the locator and function symbol, and feeds them to the control device 7. Dimming then occurs as a function of these values. It is advantageous to install the sensor 8 in the immediate vicinity of the symbol 3 so that the same incident sunlight 20 acts on both. However, it is also possible to use a central sunlight sensor (not shown in detail) for regulating.

An adjustable factor, for example, up to about 5000:1, by which the brightness can be dimmed, i.e. modified, has been found in practice. However, this range is not to be considered as limiting, but is variable as required. A brightness of 0.3 to 1500 candela/m$^3$ can be covered with no problems in the brightness regulation of the illumination of the combined locator and function symbol 3, with this range also not being viewed as limiting.

The influence of nonlinearity of a brightness/current characteristic of the particular LED 1 (LED type) occurring at high currents (internal heating) can also be compensated for by a characteristic incorporated in the software of the control device 7, with the PWM ratio preferably being matched.

Various color combinations can also be provided for incident and transmitted light when matching the emission spectrum of the LED 1 to the transmission spectrum of the plastic 5 (or vice versa).

For maximum light coupling of the light a into the light conductor 2, the distance between the LED 1 and the light conductor 2 is minimized.

In case of a larger common symbol area, it is practical to provide for several light sources that couple the light a into the light conductor 2, which is preferably shared. If there is also sufficient structural space, a color difference between the locator and function lighting can be incorporated, for example by another light source of a different color.

The light intensity is regulated through the illumination intensity determined by the sensor element 8. Below a given threshold value of the intensity of illumination, the brightness is set by a dimming signal, while above a given threshold value of the intensity of illumination, the brightness is controlled by the PWM ratio established by the sensor signal. The threshold value corresponds to the strength of illumination during twilight.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An optical indicator element, which receives light from at least one light source, wherein
    a locator symbol and an associated function symbol are illuminated jointly by the optical indicator element and an intensity of the illumination and therewith a brightness of the light source are regulated as a function of incident solar radiation, which are determined by an opto-electronic sensor,
    wherein a pulse width modulated signal is generated in a control device by comparison of ambient brightness to control the light source,
    wherein the light is fed into the indicator element through a light conductor, and
    wherein the light conductor is directly adjacent to the indicator element or is physically connected to the indicator element.

2. The optical indicator element according to claim 1, wherein the indicator element is a colored translucent plastic to which a colored paint is applied regionally.

3. The optical indicator element according to claim 2, wherein the paint is a laser paint.

4. The optical indicator element according to claim 1, wherein the light conductor is fixedly connected to the indicator element.

5. The optical indicator element according to claim 2, wherein the paint color, the colored translucent plastic, and a thickness of the optical indicator element are attuned to one another.

6. The optical indicator element according to claim 1, wherein a brightness and current characteristic of the light source is incorporated in software of the control device.

7. The optical indicator element according to claim 1, wherein various color combinations for perceived light that is transmitted by the light source can be provided for by matching an emission spectrum of the light source to a transmission spectrum of the optical indicator element or vice versa.

8. The optical indicator element according to claim 1, wherein a distance between the light source and the light conductor is minimized.

9. The optical indicator element according to claim 1, larger shared symbol area, several light sources are provided, which couple the light into a shared light conductor.

10. The optical indicator element according to claim 1, wherein there is a color difference between a perceived light emitted from the locator symbol and a perceived light emitted from the function symbol.

11. An indicator comprising:
    a light source;
    a translucent plastic having a coating on an upper surface, the coating exposing an area of the translucent plastic to thereby form a locator area and function symbol area; and
    a light guide for transmitting light from the light source to the translucent plastic,
    wherein a control device controls a light intensity of the light source by a pulse width modulated signal, the pulse width modulated signal being determined based on an illumination intensity of incident solar radiation measured by a sensor.

12. The indicator according to claim 11, wherein the translucent plastic and the coating are colored.

13. The indicator according to claim 11, wherein light transmitted through the coating has a different viewable intensity than light transmitted through the locator area and the function symbol area.

14. The indicator according to claim 11, wherein the indicator is an operating element for a vehicle.

15. The indicator according to claim 11, wherein light transmitted through the locator area and the function symbol area has a different viewable intensity.

16. The indicator according to claim 11, wherein the light guide is directly adjacent to the translucent plastic.

17. The indicator according to claim 11, wherein the light guide is physically connected to the translucent plastic.

18. The indicator according to claim 11, wherein a diameter of the light guide is smaller than a diameter of the translucent plastic measured in a plane that is parallel to the upper surface of the translucent plastic.

19. An indicator apparatus comprising:
    a light source;
    a translucent plastic having a coating on an upper surface, the coating exposing an area of the translucent plastic to thereby form a locator area and a function symbol area;
    a light guide for transmitting light from the light source to the translucent plastic;
    a sensor for measuring an illumination intensity of incident solar radiation; and
    a control device for controlling a light intensity of the light source by a pulse width modulated signal, the pulse width modulated signal being determined based on the illumination intensity.

20. The indicator apparatus according to claim 19, wherein the translucent plastic and the coating are colored.

21. The indicator apparatus according to claim 19, wherein light transmitted through the coating has a different viewable intensity than light transmitted through the locator area and the function symbol area.

22. The indicator apparatus according to claim 19, wherein light transmitted through the locator area and the function symbol area has a different viewable intensity.

23. The indicator apparatus according to claim 19, wherein the light guide is directly adjacent to the translucent plastic.

24. The indicator apparatus according to claim 19, wherein the light guide is physically connected to the translucent plastic.

25. The indicator apparatus according to claim 19, wherein a diameter of the light guide is smaller than a diameter of the translucent plastic measured in a plane that is parallel to the upper surface of the translucent plastic.

* * * * *